United States Patent

Meissner et al.

[15] 3,689,780

[45] Sept. 5, 1972

[54] CONTROL OF FLOW ACROSS A WEAK LINK IN SUPERCONDUCTIVE AND SUPERFLUID DEVICES

[72] Inventors: Hans Walter Meissner, 438 Grandview Terrace, Leonia, N.J. 07605; Roger R. Rockefeller, Dawes Avenue, Clinton, N.Y. 13323

[22] Filed: Aug. 14, 1969

[21] Appl. No.: 849,955

[52] U.S. Cl. ..................307/306, 307/245, 307/277, 317/234 C

[51] Int. Cl. ..............................................H03k 3/38

[58] Field of Search.............307/212, 245, 277, 306; 331/107 S; 332/52; 317/234, 8.1, 1.51

[56] References Cited

UNITED STATES PATENTS

| | | | |
|---|---|---|---|
| 3,204,115 | 8/1965 | Parmenter | 307/245 |
| 3,522,492 | 8/1970 | Pierce | 307/306 X |

*Primary Examiner*—Donald D. Forrer
*Assistant Examiner*—John Zazworsky
*Attorney*—Robert S. Dunham, P. E. Henninger, Lester W. Clark, Gerald W. Griffin, Thomas F. Moran, R. Bradlee Boal, Christopher C. Dunham, Robert Scobey, Thomas P. Dowd and Ivan S. Kavrukov

[57] ABSTRACT

A method and means for influencing flow in a superconductive or superfluid device by introducing a control flow into a region interposed between two regions characterized by internal flow in the form of superflow. A superconductive device is presented comprising a superconductive region capable of emitting current and a superconductive region capable of receiving current, which regions are separated by an interposed region, not in a superconductive state but capable of transferring current between the two regions. When control current (AC or DC) is introduced into the interposed region from an external source, an interaction takes place between the control current and the main current being transferred through the interposed region and influences the main current in a manner which is described. An equivalent superfluid device is also discussed for electrically neutral fluid flow across a region separating two regions characterized by internal superflow.

23 Claims, 12 Drawing Figures

INVENTORS
HANS W. MEISSNER
ROGER R. ROCKEFELLER
BY
Thomas J. Moran
ATTORNEY

INVENTORS
HANS W. MEISSNER
ROGER R. ROCKEFELLER
BY
[signature]
ATTORNEY

INVENTORS
HANS W. MEISSNER
ROGER R. ROCKEFELLER
BY
[signature]
ATTORNEY

INVENTORS
HANS W. MEISSNER
ROGER R. ROCKEFELLER
BY
Thomas J. Moran
ATTORNEY

CONTROL OF FLOW ACROSS A WEAK LINK IN SUPERCONDUCTIVE AND SUPERFLUID DEVICES

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates to the field of devices employing superconductive and superfluid effects and more particularly to methods and means for influencing flow across a region not in a superflow state which is interposed at least partially between two regions characterized by internal flow in the form of superflow.

Superconductivity and superfluidity have been characterized as quantum mechanical states in which a collection of particles exhibits quantum phase coherence. The states are associated with the phenomena of supercurrent and superfluid flows when flow without entropy production occurs within materials. Such flow which is called superflow ceases to exist above a certain temperature called the "transition temperature" which is characteristic for each particular material. Above this temperature the material is then non-superconductive or non-superfluid.

The superconducting transition temperatures for most metals and alloys are well known in the art, although at present some metals have not become superconductive down to the lowest available temperatures. On the other hand some semi-conducting compounds have been found to become superconducting and organic compounds are presently under investigation for their superconducting properties.

Supercurrent has been investigated for several decades, but in recent years particular interest has been stimulated by the discovery of the Josephson effect which relates to current flow through a discontinuance separating two superconductive regions. The region of the discontinuance may be termed a "weak link" and is anything which separates two superconductive regions and which is not itself a superconductor, that is, not in a superconductive state as are the flanking superconductive regions, but which nevertheless transfers current therebetween. The weak link may be, for example, a layer of insulator, or a layer of non-superconductive metal or semiconductor material, or several layers some of which may be superconductive, or the like ( see "Superconductivity," R. D. Parks, Editor, Volumes 1 and 2 Marcel Dekker, Inc., New York, 1969).

An explanation of the Josephson effect is based on postulating the existence of an attractive force between electrons. Although electrons have a negative charge and normally repel each other, in certain materials — because of a lattice of ions or because of other causes — there may be a weak attractive force in addition to the usual repulsive force between electrons. In a superconductive material, the lattice or otherwise mediated attractive force between the electrons must exceed the repulsive force; the net interaction between electrons must be attractive. The attractive force tends to couple together pairs of electrons that have equal and opposite momentum and spin. The binding is extremely weak and may be disturbed, for example, by a temperature rise of only a few degrees.

Because the attraction is weak, two electrons of a bound pair may be separated by a distance thousands of times greater than the distance between ions in the same region. The electrons of each bound pair thus range over a volume that simultaneously contains millions of other electron pairs. If the requirements of the exclusion principle ( which states that two electrons with the same spin cannot occupy the same spatial position) are to be met, the motions of all pairs must be correlated. The correlation is in that the centers of mass of all the pairs have the same momentum. All the electron pairs are locked together by the fact that they have a common center-of-mass momentum and it is impossible to disturb a single pair without disturbing all the pairs.

Each particle is associated with certain wave aspects and an electron pair with a specific center-of-mass momentum may be described by a wave whose wavelength is inversely proportional to that momentum. If the center-of-mass momentum of all electron pairs is the same, then the waves describing the pairs have the same wavelength. Further, in order to optimize the average binding energy of the pairs occupying the same volume and still satisfy the exclusion principle, the phases of all pair waves must be the same. Thus, in a superconductor, the waves of all the pairs have the same wavelength and the same phase. This common phase is a function of the center-of-mass momentum of the pairs.

In addition to having their phase dependent on center-of-mass momentum, the waves associated with the electron pairs also have a time oscillation with a period defined by the energy of the pairs. The phase of each pair is thus a function of two separate and distinct quantities; a function of both the center of mass momentum, and of the energy of each pair.

The phase of the pairs throughout a single superconductive region must be completely correlated because pairs can move freely through it. If the superconductive region is divided into two distinct regions and the two regions are so far apart that pairs cannot be exchanged between them, there need not be any specific relation between the pair phases in the two regions. If the two regions are, however, brought sufficiently close to each other because of their wave-like nature, electrons can "tunnel" from one region to the other and the system assumes a state of minimized energy in which there is a specified relationship between the pair phases in the two superconductive regions.

If a phase difference which is not a multiple of $\pi$ is established between two superconductive regions that are sufficiently close, electron pairs are transferred in a net flow in one direction and current flows between the two regions. If effect, one of the regions emits current over a certain distance into a weak link, and the other region receives this emitted current passing through the weak link. The amount of emitted and received net current is a sinusoidal function of the phase difference between the pairs of the two superconductive regions. There is thus a direct flow of current between the two superconductive regions without a voltage drop. The entire junction made up of the two superconductive regions and the weak link separating them behaves as a single superconductive region. This phenomenon is known as the D.C. Josephson effect. In this D.C. effect, the current does not vary in time and is intimately linked with the phase difference between the two superconductive regions; in other words, the phase difference depends on the center-of-mass momentum of the electron pairs. There is no voltage difference between the two superconductive regions.

If, however, there is voltage difference between the two superconductive regions, the phase difference does vary in time because, as mentioned earlier, phase also depends on energy, and the voltage drop causes the phase to shift in time. Because of the sinusoidal relationship of the current between the two superconductive regions on phase, the current oscillates back and forth between the two superconductive regions at a frequency proportional to the voltage drop between the regions. This is known as the A.C. Josephson effect. The frequency of oscillation is very high and some radiation in the microwave and far infrared regions of the electromagnetic spectrum takes place. Voltage difference between the two superconductive regions may be established by increasing the current therethrough until the "critical Josephson current" is exceeded.

An experiment believed to be an indirect confirmation of the A.C. Josephson effect has been performed and involves the transfer of microwave energy between an external source and a Josephson junction. The D.C. voltage across the two superconductive regions of a Josephson junction is varied and the current through the junction is measured while the whole junction is exposed to microwave radiation generated by an external source. In addition to the D.C. voltage across the junction, there is also a small voltage induced by the applied microwave radiation which small voltage oscillates at the microwave frequency. Since the frequency of the Josephson current depends on the junction voltage, the current is frequency-modulated by the oscillating small voltage. Thus, the frequency of the oscillating current between two superconductive regions ranges over a spectrum. At a voltage between the two superconductive regions for which the Josephson current frequency is equal to the applied microwave field frequency or a whole number multiple of it, among all the possible net frequencies there is one that equals zero. At zero frequency, there is a measurable direct current across the junction. The energy exchange which exists in this experiment is between the external microwave source and the two superconductive regions of the Josephson junction.

Superfluid flow can also be considered as based on frequency and phase coherence between the waves associated with particles in the superfluid, and phenomena corresponding to the Josephson D.C. and A.C. effects can be described in a manner similar to that used in connection with supercurrent flow. A particular example is the superfluid phenomenon which corresponds to applying an external microwave field to a Josephson superconductive junction having a D.C. voltage difference across the two superconductive regions. For superflow, the height difference between two columns of superfluid vented to each other by an orifice corresponds to the voltage difference between superconductive regions. Superfluid normally flows smoothly and rapidly through the orifice. If the waves associated with each column are coherent in phase within each column but the wave in one column differs from that of the other by an amount proportional to the height difference, the difference results in an alternating flow through the orifice superimposed on the overall steady flow from the high to the low column. If a transducer is positioned near the orifice and operated at constant frequency, the height-determined frequency successively equals a number of integer multiples of the transducer frequency. At each point of equality, the steady flow is strongly affected and may even cease briefly.

It should be understood that the foregoing is given as a background of state-of-the-art developments related to the present invention but is not intended as an explanation of the phenomena associated with the invention.

SUMMARY OF THE INVENTION

The present invention comprises the method and means of introducing a control flow into a region which is interposed between two regions, having superconductive or superfluid properties, to influence the superflow between them.

More particularly, in the case of two superconductive regions separated by an interposed region not in the superconductive state, for example, as previously discussed in connection with the Josephson effect, the subject invention is concerned with the introduction of a control current from an external source into the interposed region or weak link rather than influencing the voltage between the superconductive regions with microwave radiation. In a particular superconductive embodiment, the subject invention provides for connecting one or more electrodes to the interposed region of a three region superconductive device and establishing a current flow from an external source in the interposed region. The control current influences the flow of supercurrent between the superconductive regions in a manner which is described, resulting in appreciable and consistent changes of particular utility.

Devices embodying the invention may take many forms, but the superconductive regions used in any of these devices may be generally defined as regions including material which, if it could be put into the form of a bulk ring and if current flow below a critical value could be established around it, would substantially maintain the current flow for a period of the order of months when free of external influences. The internal current flow would be in the form of a superflow as opposed to normal flow which is accompanied by energy dissipation. The interposed region or weak link cooperating with the superconductive regions in any device embodying the invention may generally be defined as a region having properties associated with regions in which, in the terminology used in the Background section of this application, the phase coherence between particles is substantially lowered. An important dimension for the weak link is the coherence distance. Determinations of the coherence distance for many materials have been made and this quantity is now well known to those skilled in the art. While older researchers prefer to use the name "range of order distance" present terminology uses the words "coherence distance" or "extrapolation length" as pointed out by G. Deutscher and P.G. DeGennes in "-Superconductivity" (R.D. Parks, Editor, Marcel Dekker, Inc., New York 1969, p. 1006 and p. 1009).

Superfluids, as for example Helium II are characterized by the lack of appreciable flow resistance as opposed to normal flow which is accompanied by energy dissipation and weak links in superfluid environments may be defined in the same manner as weak links in superconductive environments. Examples of superfluid weak links are orifices, of the order of 15 microns, for example, and the sharp rim of a vessel containing superfluid in the process of flowing over the rim in film flow. The internal flow in bulk superfluid has been termed superflow.

An embodiment of the invention in a superfluid environment comprises an upright open vessel having a sharp rim and containing superfluid, the vessel being immersed partially in a superfluid bath. Film flow takes place between the vessel, over the sharp rim thereof, to the superfluid bath. This is the main flow. Control over the main flow is by means of control flow applied to the rim from another vessel containing either superfluid or nonsuperfluid.

DETAILED DESCRIPTION OF THE INVENTION

The principles of the present invention have general application in connection with flow without entropy production, which we shall call superflow and which includes supercurrent and superfluid flow phenomena; supercurrent being the superflow of a charged medium and superfluid flow being the superflow of an uncharged medium.

Figure 1:
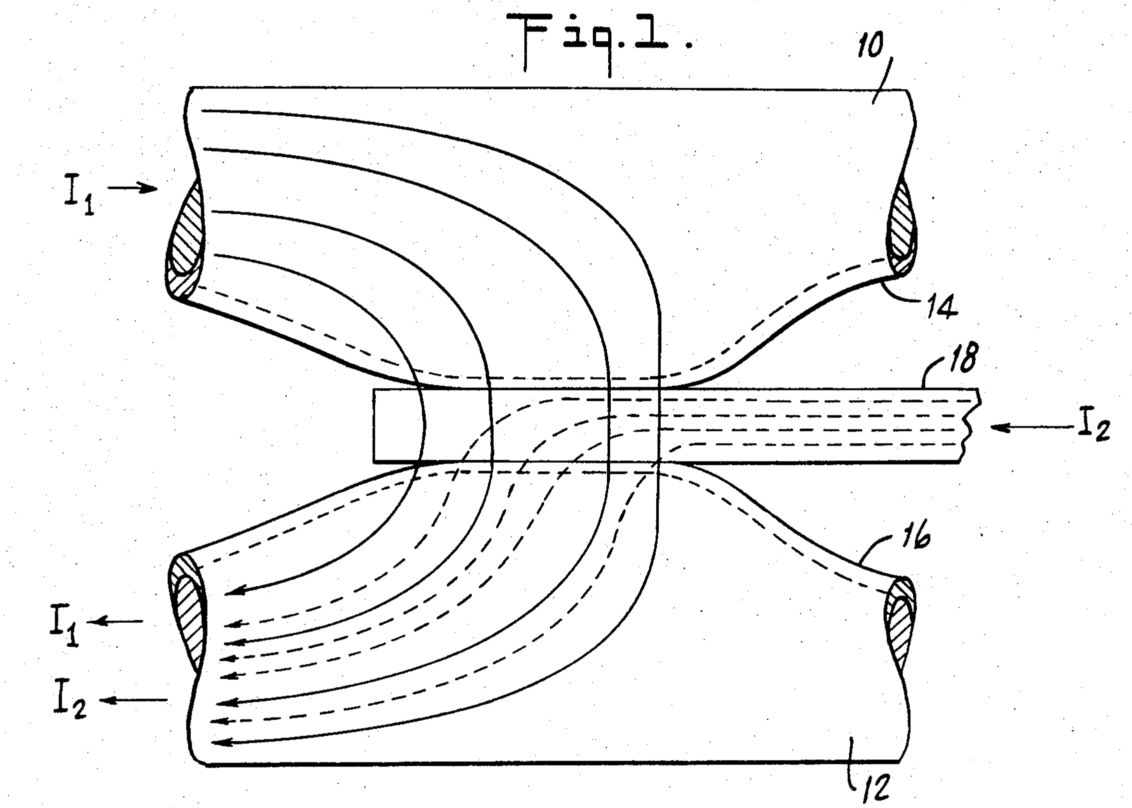
FIG. 1 is a diagrammatic view of a superflow device illustrating the operation of the present invention and comprising two regions in a superflow state separated by an interposed region which impedes superflow.

A superflow device of the form of the present invention is shown diagrammaticly in FIG. 1 and comprises two regions 10 and 12 which are in a superflow state and an interposed region 18 which impedes superflow. The regions 10 and 12 may be of many diverse materials, forms, and shapes; the only requirement being that somewhere in each region there be a collection of particles or some media having superflow properties.

The interposed region 18 which we shall call a "weak link" may be of any material, form, or shape which is generally not in a superflow state but which can under certain conditions transfer superflow between the regions 10 and 12. The distance between the two superflow regions 10 and 12 across the weak link 18 is of the order of the coherence distance through the particular material comprising the weak link.

Figure 3:
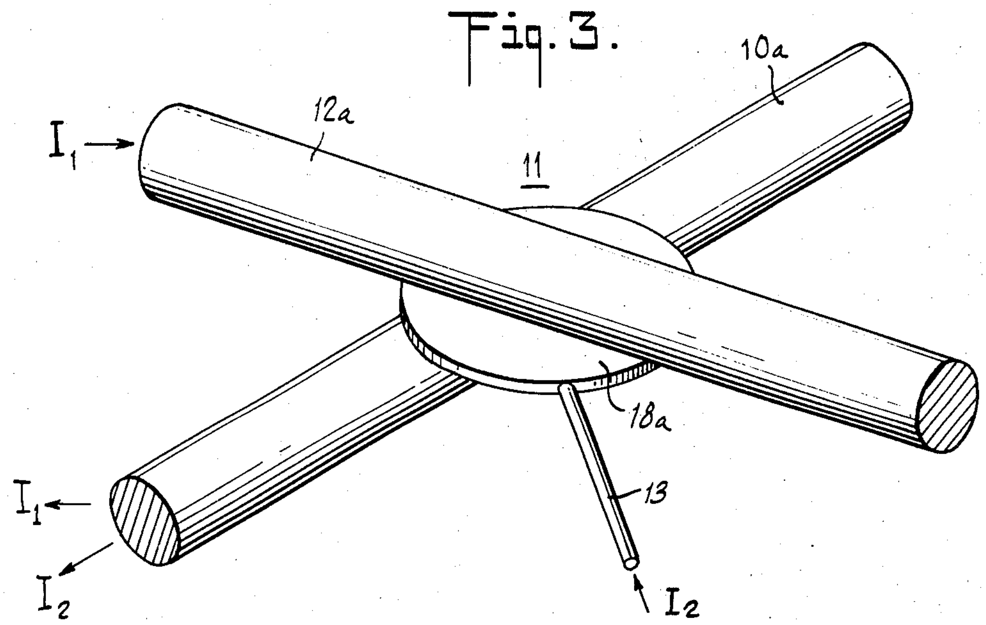
FIG. 3 is a detailed perspective view of a superconductive device embodying the invention.

A superflow device of this general form may have many practical embodiments, such as, for example, the superconductive device 11 shown in FIG. 3 which comprises crossed superconductive wires 10*a* and 12*a* separated by a very thin film 18*a* attached to a terminal or holder 13. The wires 10*a* and 12*a* may be of tin, cooled below the transition temperature at which tin becomes superconductive, and, in the area of the weak link 18*a*, may be coated with layers 14 and 16 ( indicated in FIG. 1) of a very thin film of gold of the order of 100 angstroms which protect the wires in that region from oxidation. The weak link 18*a* may be a gold film having a thickness of the order of the coherence distance of gold, for example, in the range from 1,000 angstroms to 10,000 angstroms.

The present invention involves the introduction of a main current $I_1$ into one of the superconductive wires for example, 12*a*, causing current flow across the weak link 18*a* and out an end of the other superconductive wire 10*a;* and the introduction of a control current $I_2$ into the weak link 18*a* by means of the conductive holder or terminal 13, which current is returned at any convenient point on either of the superconducting wires.

More particularly, main flow $I_1$ may be established by any conventional means, such as that used with a conventional Josephson junction. The current $I_1$ is illustrated in detail in FIG. 1 by the solid lines going from the superconductive region 10, through the weak link 18, to the superconductive region 12. However, it should be understood that FIG. 1 is intended to show the intermingling of the flow but not necessarily the actual position of the flow lines.

The control current $I_2$ may be similarly supplied by any suitable external source and is introduced into the weak link 18 as indicated by the broken lines in FIG. 1. With the flow thus established, up to a certain value of $I_1$ there is no voltage difference between the superconductive regions 10 and 12 so that the current passing between regions 10 and 12 is pure superflow corresponding to the D.C. Josephson effect. Net current is in effect emitted from the superconductive region 10, transferred through the weak link 18 and received by the superconductive region 12. When a certain critical value of $I_1$ is exceeded, however, a voltage difference develops between the superconductive regions 10 and 12. The measurements described below in accordance with the present invention show that this critical value of $I_1$ can be influenced by the amount and direction of the control current $I_2$.

Figure 4:
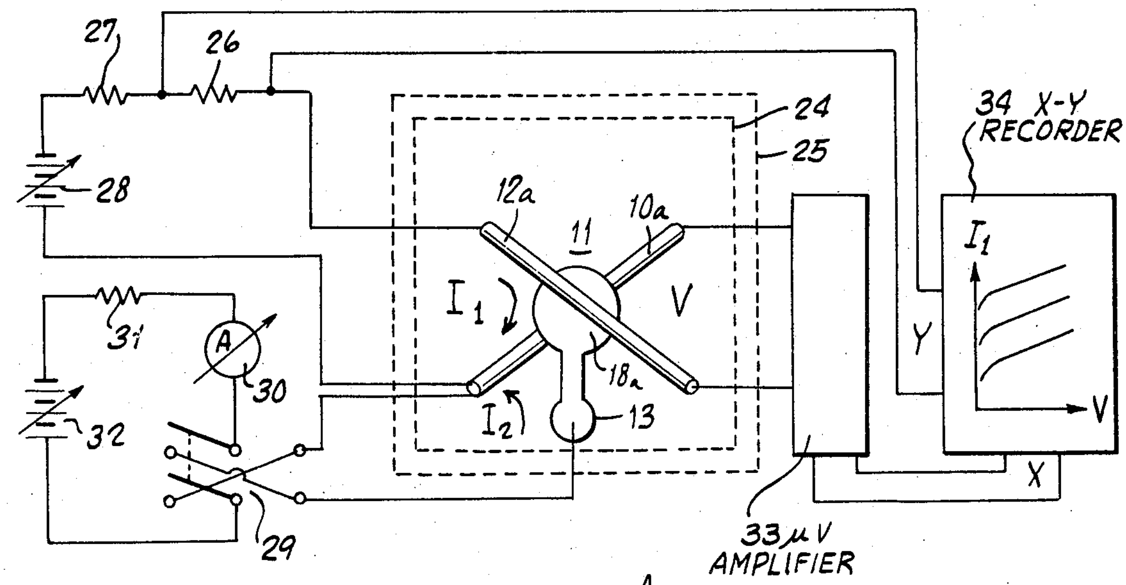
FIG. 4 is a schematic diagram showing the device of FIG. 3 connected in an electrical circuit for generating and applying currents thereto and connected also to measurement apparatus.

An experimental circuit of the type used for supplying and measuring the currents $I_1$ and $I_2$ is shown in FIG. 4. The superconductive tin wires 10*a* and 12*a* are connected to each other through a series circuit comprising shunt 26, resistor 27 and a voltage power supply 28, causing the main current $I_1$ to flow across the weak link 18*a*. If the resistor 27 is of a comparatively high value, the current $I_1$ will be kept substantially independent of the voltage across the wires 10*a* and 12*a*, and the device is said to operate in the constant current regime.

The control current $I_2$ is set up in a loop comprising the superconductive tin wire 10a and the weak link 18a which are connected to each other through a series circuit, comprising reversal switch 29, a meter 30, resistor 31 and another variable voltage power supply 32.

The device 11 is immersed in a liquid helium bath indicated by a broken line 24 and may be shielded from magnetic fields by a shield 25 which may be in the form of a set of Helmholtz coils or a set of Mumetal shields or both.

The voltage between the superconductive wires 10*a* and 12*a*, is measured by means of a microvolt amplifier 33 connected to the X-deflection inputs of a conventional X-Y recorder 34. The vertical deflection inputs of the X-Y recorder 34 are connected to the shunt resistor 26 for the purpose of measuring the current $I_1$ by displaying it along the Y axis of the recorder. Alternatively, for higher frequencies, an oscilloscope may be used in place of the X-Y recorder 34. It was found convenient for the voltage connections to use the ends of the superconductive wires 10*a* and 12*a* opposite to those used for the current connection, thus making the device 11 a five terminal device. However, if desired, the voltage leads may be connected to the ends used for the current leads, making the device 11 a three terminal device. In practical application it may be conceptually easier to think of the device as a three terminal device.

In operation, the current $I_1$ generated by the variable voltage supply 28 and applied to the superconductive wire 12a is gradually increased from zero while no control current $I_2$ is applied to the weak link 18*a*. The current $I_1$ is measured as the vertical deflection of the X-Y recorder 34 while the current $I_2$ will be measured by the Ammeter 30. The voltage across the superconductive wires 10a and 12a is measured as the horizontal deflection of the X-Y recorder 34.

As the main current $I_1$ is increased from zero, at first no voltage appears across the superconductive wires 10*a* and 12*a* and all current through the device 11 is supercurrent emitted from one of the superconductive wires, transferred by the weak link 18*a*, and received by the other superconductive wire. When the critical value $I_c$ of the supercurrent is reached, a voltage appears across the superconductive wires 10*a* and 12*a*. For values larger than the critical current $I_c$, the actual current measured by the X-Y recorder 34 is a substantially linear function of the voltage across these wires.

When, however, control current $I_2$, as generated by the supply 32 and measured by the Ammeter 30, is caused to flow through the weak link 18*a*, it is observed that the value of the critical current $I_c$ is affected. If the currents $I_1$ and $I_2$ are in the same direction, the value of the critical current $I_c$ is decreased as a function of the current $I_2$; if the currents $I_1$ and $I_2$ flow in opposite directions, the value of the critical current $I_c$ through the device 10 is increased. It would appear that the control current $I_2$ affects the phase difference between the coherent waves in the two superconductive regions by increasing the phase difference when it is in the same direction as $I_1$ and decreasing the phase difference when it is in the opposite direction.

Figure 2:
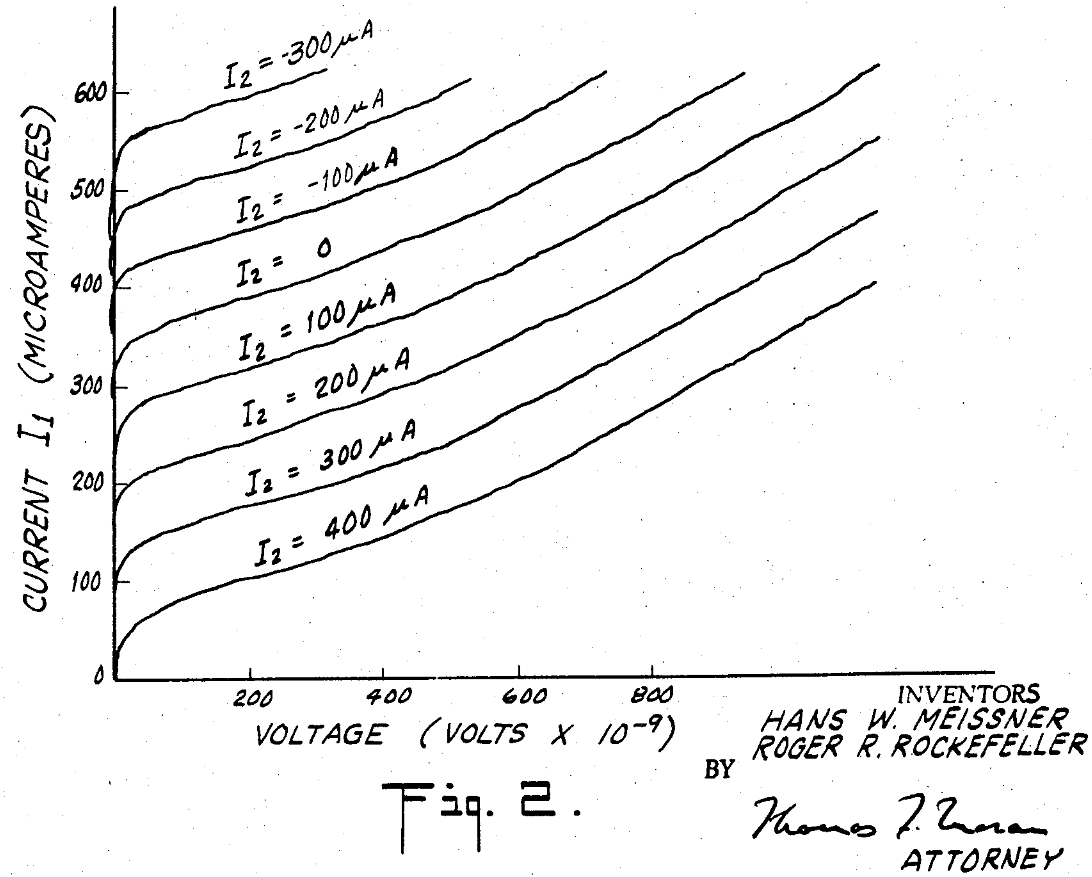
FIG. 2 shows a series of voltage-current curves indicating current flow through a device such as shown in FIG. 1 for several values of control current supplied to the interposed region.

A set of voltage-current curves has been obtained, based on experimental data using a device, such as the device 11, and is illustrated in FIG. 2.

The curve labelled $I_2=0$ represents the case where only the main current $I_1$ flows between the superconductive wires 10*a* and 12*a*, that is when no control current $I_2$ is introduced into the weak link 18*a*. For this case the main current $I_1$ has a critical value $I_c(I_2=0)$ of about 320 microamperes. When that value of $I_1$ is exceeded, a voltage appears between the superconductive wires 10*a* and 12*a* and grows approximately linearly with further increase of the current $I_1$. Previously the only known methods of influencing the critical current $I_c$ were a change of temperature or the application of a magnetic field.

It will be seen, however, that when control current $I_2$ is introduced into the weak link 18*a*, a dramatic change takes place. If the control current $I_2$ flows in the same direction as the main current $I_1$, the critical value of $I_1$ at which a voltage difference appears between the superconductive regions 10 and 12 decreases. It should be noted that the decrease in the critical value is not equal to $I_2$ although it is a function of $I_2$. If the control current $I_2$ flows in the opposite direction from the main current $I_1$, the critical value of $I_1$ at which a voltage difference appears between the superconductive wires 10*a* and 12*a* increases, again as a function of the value of $I_2$, but not by amounts equal to $I_2$.

The voltage-current graphs for the current $I_1$ at finite voltages are also spaced from each other by amounts depending on, but not equal to, the magnitude of the control current $I_2$ introduced into the weak link 18*a*. It will be noted that these voltage-current graphs are very similar to those found for semiconducting transistors, and thus the present device will lend itself to similar applications such as amplifiers, oscillators, switches, memory devices and the like.

Figure 5:
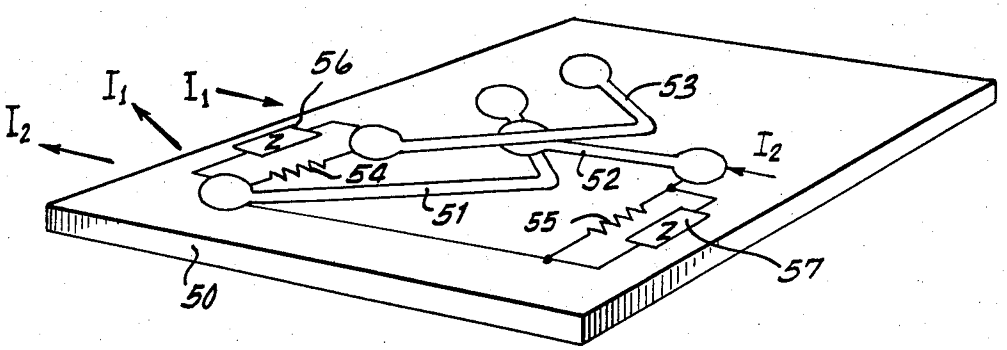
FIG. 5 is a perspective view of another superconductive embodiment of the present invention in a thin film application.

A particularly useful form of a device embodying the present invention in a thin film application is shown in FIG. 5 and comprises an insulating substrate 50 and a V-shaped film 51 of a superconducting metal, such as, tin which may be created by vapor deposition or by sputtering. A weak link in the form of a bar bell shaped film 52 of a metal above its transition temperature, for instance gold, is deposted over the V-shaped film 51 such that one of its bells covers a portion of one leg of the film 51. A second V-shaped film 53 of a superconductor, such as tin, is deposited such that a portion of one of its legs overlays both the gold 52 and a portion of the leg of the film 51 which is under the gold. This device, as that shown in FIG. 4, may be submerged in a liquid helium bath such that the tin is maintained below, but the gold is maintained above, their transition temperatures. The device may be similarly shielded from the effects of external magnetic fields.

Resistors 54 and 55 may be incorporated into the film structure, with resistor 54 connected between the two superconductive tin films 51 and 53, and the resistor 55 connected between the tin film 51 and the gold 52, for the purpose of changing the operating regime of the device in the range between constant current-variable voltage and constant voltage-variable current. Other types of impedances 56 and 57 may be used in addition to or instead of resistors 54 and 55 respectively. Such a device can find wide utility for use in amplifiers, switches, memory devices or the like.

Figure 6:
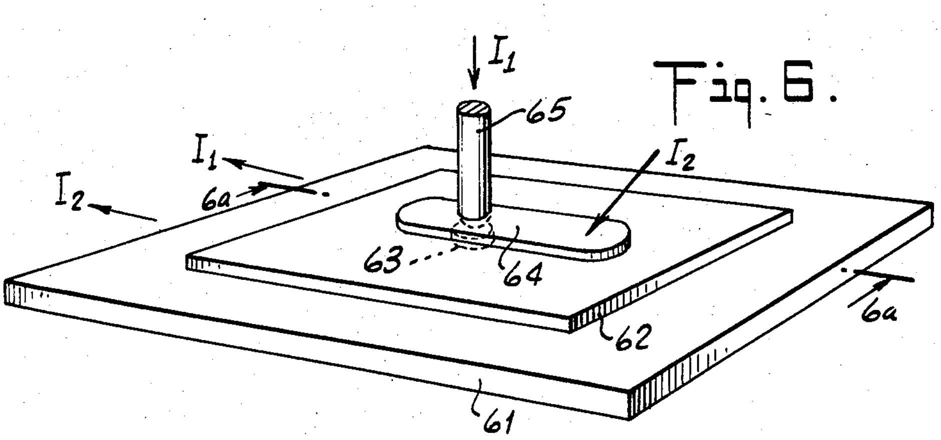
FIG. 6 is a perspective view of a further superconductive embodiment of the present invention.
Figure 6A:
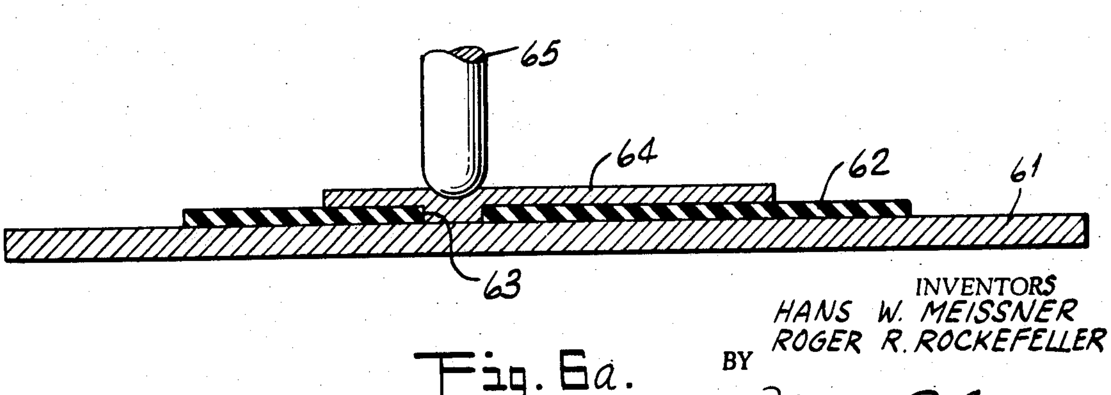
FIG. 6*a* is a cross-sectional view taken along the lines 6A—6A of FIG. 6.

Another form of device embodying the present invention which is particularly useful in obtaining uneven impedances is shown in FIGS. 6 and 6a. This device comprises a plate 61 of superconductive material with a superimposed insulating layer 62. The insulating material is removed to create an opening 63 in the insulating layer 62 and a weak link film 64 of metal such as gold is deposited over a portion of the insulating layer 62 which includes the opening 63. The gold 64 thus contacts the superconductive plate 61. The sharp apex of a pointed superconducting rod 65 contacts the non-superconducting metal 64 within the cut-out area 63. The main current $I_1$ flows into the superconductive rod 65 and out of the superconductive block 61 while the control current $I_2$ flows into the gold 64 and either into the superconductive plate 61 or the rod 65. It will be seen that the current channel in this device is not particularly symmetrical so that uneven impedances may be obtained.

Figures 7, 9:
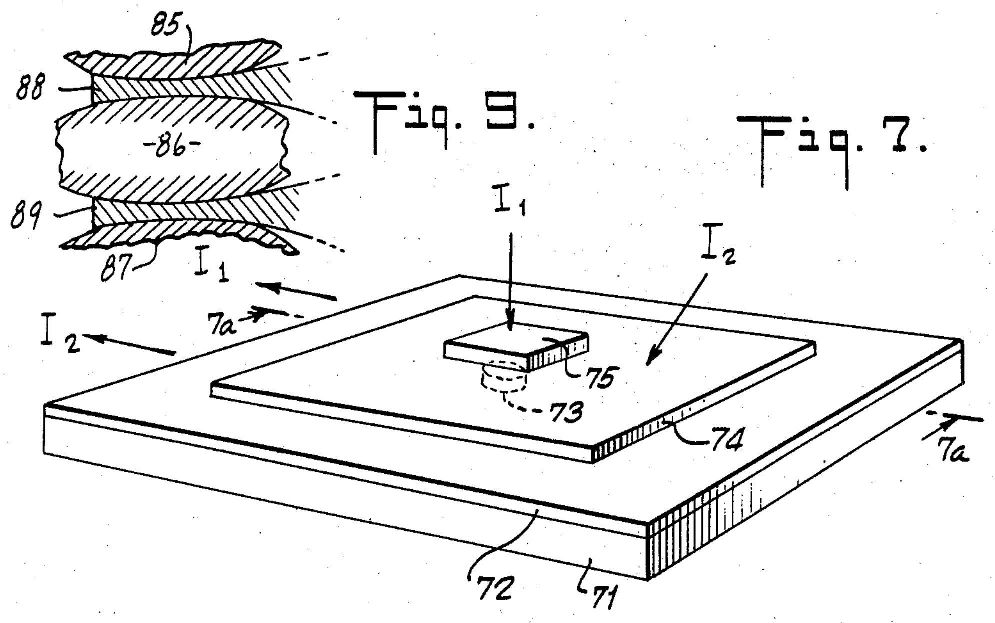
FIG. 7 is a perspective view of yet another superconductive embodiment of the present invention as applied to a superconductive chip.
FIG. 9 is a partial sectional view of a composite of alternately arranged superconductive and interposed regions.
Figure 7A:
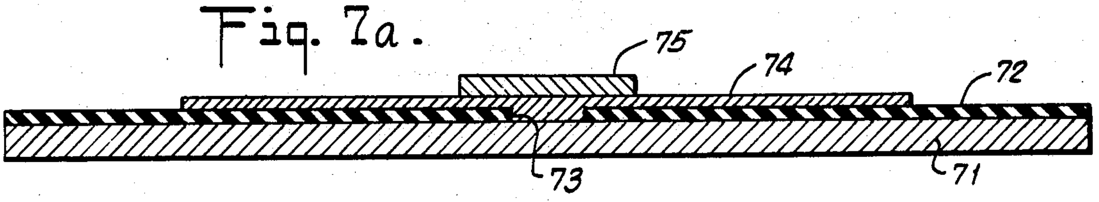
FIG. 7*a* is a cross-sectional view taken along lines 7A—7A of FIG. 7.

A further form of device embodying the present invention is shown in FIGS. 7 and 7a. This embodiment will facilitate manufacturing of the device when it is convenient to make it on a chip. Accordingly, it comprises a superconductive chip 71 such as of niobium or niobium-tin carrying a superimposed insulating layer 72. A small aperture 73 is cut into the insulating layer 72 by etching, or electron or ion bombardment. The aperture 73 and the area around it is covered by a weak link in the form of a film 74 of nonsuperconducting metal. Another superconductive film 75 is deposited over the area including the aperture 73. Connections for the main current $I_1$ are made to the superconductive film 75 and the superconductive chip 71; connections for the control current $I_2$ are made to the metal film 74 and to the superconductive chip 71.

In all of the embodiments discussed above, any one of the superconductive regions may include, for example, materials such as the following, when maintained below their transition temperatures: tin, lead, indium, niobium, tantalum, vanadium, niobium nitride, niobium-tin alloys, as well as other combinations and alloys thereof. The weak link may include, for example, materials such as gold, silver, platinum, rhodium, chromium, nickel, alloys and combinations thereof, as well as materials such as semiconductors, and heavily-doped semiconductors in particular, organic materials, or photosensitive materials. Also useful is a region of a superconductor which has been made into a type II superconductor by the application of suitable magnetic fields or a constriction in superconductive material as disclosed for example in U.S. Pat. No. 3,335,363 to Anderson et al. Of particular usefulness are materials such as aluminum, zinc, cadmium and bismuth as well as alloys and combinations thereof, because of their higher resistance to developing diffusion problems. As a particular example, the superconductive regions may be made of alloys of indium with less than 3 percent bismuth while the weak link may be of zinc. Or the superconducting region may be of lead while the weak link is of a copper aluminum alloy. As another particular example the superconducting regions may be of niobium while the weak link is of copper.

Figure 8:
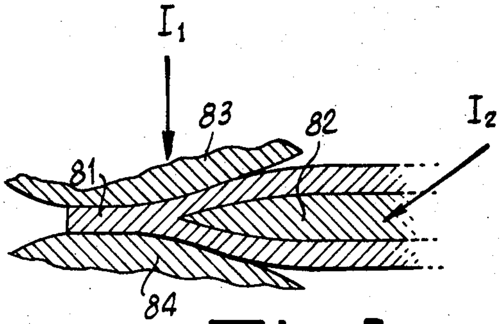
FIG. 8 is a partial sectional view of a composite interposed region having both superconductive and non-superconductive regions.

In order to reduce the resistivity which the control current $I_2$ encounters in flowing through the weak link, the weak link may be a sandwich structure as shown in FIG. 8 where the reference numeral 81 denotes material which is any one of the materials mentioned for use as a weak link while the wedge 82 is a superconductive region. Connection for the current $I_2$ is made to the superconductive region 82 while the superconductive regions 83 and 84 exchange the main current $I_1$.

A device comprising several superconductive regions, each two adjacent superconductive regions being separated from each other by a weak link, is also contemplated by the subject invention. This type of device can be operated in either of two different modes. For example, in a device having three superconductive regions 85, 86 and 87 and two interposed weak links8 8 and 89 such as shown in FIG. 9, the main current may be introduced between the two outer superconductive regions 85 and 87 and control flow may be introduced into either one or both of the weak links 88 and 89. Alternatively, only a portion of the device may be used by causing main current flow between any two adjacent superconductive regions and introducing control flow into the weak link interposed between them.

Figure 10:
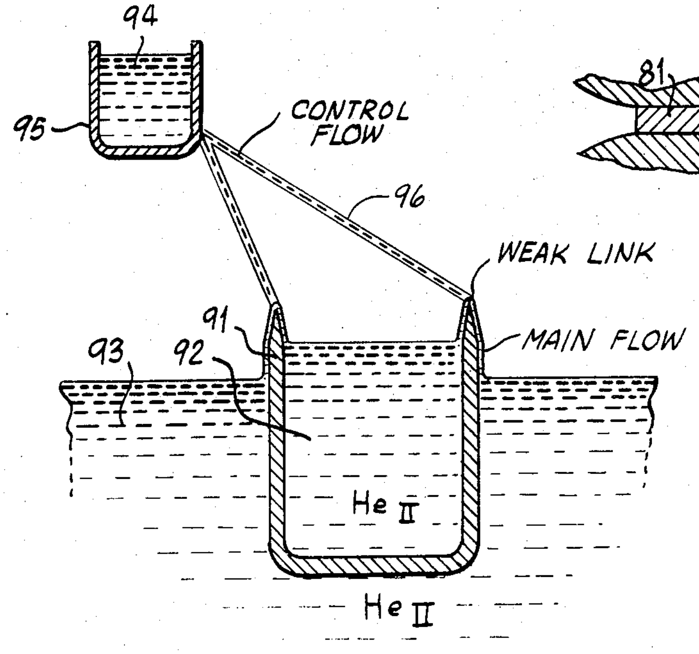
FIG. 10 is a diagrammatic view of an embodiment of the invention in a superfluid environment.

A particular embodiment of the present invention applicable in a superfluid environment and utilizing a superfluid, such as Helium II, is shown in FIG. 10.

A vessel 91 is shown filled partially with superfluid 92 and immersed partially in a bath of superfluid 93. The superfluids 92 and 93 because of their properties establish film flow along the wall of the vessel 91 between their fluid levels. The rim of the vessel 91, which is a particularly sharp rim, comprises a weak link interposed in the path of the film flow. The film flow corresponds to the main current discussed in connection with the superconductive embodiments of the invention and is called the "main flow." The main flow is influenced by control flow of another liquid 94 contained in a separate vessel 95. When control flow is applied to the rim of the vessel 91, such as through a thread or capillary tube 96, the main flow is influenced in a manner similar to influencing main current by control current as discussed previously.

The voltage measured with superconductors is presented here by the difference in level between 92 and 93. As in the superconducting case film flow is possible in the absence of a difference of level, provided the flow is less than a critical flow. Above this value a level difference is necessary to maintain the flow. The control flow from 95 influences the onset of a level difference in a manner analogous to the action of the control current in the superconducting case.

A method and means is thus presented for introducing a control flow into a region, not in a superflow state, but which is interposed between two regions in a superflow state which are exchanging superflow across it, to influence the superflow in such manner as to render the arrangement useful in a wide variety of applications.

We claim:

1. A superflow device comprising:

a. a first region capable of emitting net flow at least part of which is superflow distinct from normal flow;
b. a second region capable of receiving net flow at least part of which is superflow;
c. a third region interposed at least partially between said first and second regions and capable of accepting flow emitted from said first region and of transferring at least a part of said flow to said second region; and
d. means coupled with said third region for introducing control flow therein.

2. A superconductive device comprising:
a. a first region capable of emitting net current and characterized by internal flow of current which proceeds as supercurrent distinct from normal current;
b. a second region capable of receiving net current and characterized by internal flow of current which proceeds as supercurrent;
c. a third region interposed at least partially between said first and second regions and capable of accepting net current emitted from said first region and of transferring at least a part of said current to said second region; and
d. means coupled with said third region for exchanging flow therewith.

3. A device as in claim 2 wherein:
said means of subparagraph ( d) comprises an electrode coupled with said third region for introducing control current therein.

4. A device comprising:
a. a plurality of regions, each region characterized by a plurality of particles having phase coherence, the coherent phase of each region being independent of that of other regions;
b. a plurality of weak links, each interposed between two of said regions and each capable of transferring main flow transmitted between the two flanking regions said main flow including superflow distinct from normal flow; and
c. means coupled with at least one of said weak links for creating a flow independent of any flow transmitted through said weak link by the adjacent regions.

5. A device comprising:
a. a first and a second region characterized by phase coherence within at least a portion of each of said first and second region, said regions separated from each other in at least one location by a distance of the order of the coherence distance of the separation;
b. a third region interposed between said first and second regions in said area and capable of transferring flow defined as main flow transmitted from one of said first and second region to the other over said coherence distance, said main flow including superflow distinct from normal flow; and
c. means, independent of the main flow transferred between said first and second regions, for establishing through said third region a control flow.

6. A superconductive device comprising:
a. two superconductive regions separated from each other by a region of non-superconductive material of thickness less than the coherence distance therethrough;
b. means for causing current flow from one of the superconductive regions to the other through the non-superconductive material; and
c. means for causing control current flow between the non-superconductive material and one of the superconductive regions.

7. A device as in claim 6 wherein the superconductive regions include superconductors selected from the group consisting of tin, lead, indium, niobium, niobium-nitride, niobium-tin alloys, tantalum, vanadium and alloys thereof.

8. A device as in claim 6 wherein the non-superconductive material includes metal selected from the group consisting of gold, silver, copper, platinum, rhodium, chromium, nickel, aluminum, zinc, cadmium, bismuth and alloys thereof.

9. A device as in claim 6 wherein the non-superconductive material includes material selected from the group consisting of doped germanium and doped silicon.

10. A three terminal superconductive device comprising:
a. two superconductive regions separated from each other by a non-superconductive material of thickness less than the coherence distance between the two superconductive regions through the material;
b. a first, second and third terminal connected respectively to the two superconductive regions and to said non-superconductive material;
c. means for causing main current flow between said first and second terminals from one superconductive region to the other;
d. means for causing control current flow between said third terminal and one of said first and second terminals; and
e. means for maintaining said superconductive regions in superconductive state characterized by current flow in the form of supercurrent within said regions.

11. A device as in claim 10 including:
means connected between said first and said second terminals.

12. A device as in claim 10 including:
impedance means connected between said third terminal and at least one of said first and second terminals.

13. A multiterminal device comprising:
a. two superconductive regions separated from each other by a non-superconductive material of thickness less than the coherence distance between the two superconductive regions through the material;
b. a first terminal connected to said material;
c. a second terminal connected to one of said superconductive regions;
d. at least a third and a fourth terminal connected to different portions of the other superconductive region;
e. means for causing main current flow between said second terminal and at least one of said third and fourth terminals;
f. means for causing control current flow through a path including said first terminal and at least a portion of said non-superconductive material; and g. means for maintaining said superconductive regions in a superconductive state characterized by current flow in the form of supercurrent within said regions.

14. A superconductive device comprising:

a. two superconductive wires crossing each other at an angle and separated from each other at the area of the crossing by non-superconducting material having thickness less than the coherence distance between said wires across said material;

b. means for causing main current flow between said wires;

c. means for causing control current flow between said material and at least one of wires; and d. means for maintaining said wires in a superconductive state in which current within each wire proceeds as supercurrent.

15. A device comprising:

a. an insulating substrate;

b. a first strip of superconductive film overlaying a portion of said substrate;

c. a film of non-superconducting material overlaying at least a portion of said first strip of superconductive film;

d. a second strip of superconductive film overlaying at least a portion of said first strip of superconductive film but separated therefrom by said material;

e. means for causing main current flow between said first and second strips of superconductive film; and f. means for causing control current flow between said material and at least one of said strips of superconductive film.

16. A device comprising:

a. a plate of superconductive material;

b. a superimposed layer of insulating material having an aperture exposing the superconductive plate;

c. a region of non-superconducting material filling said aperture at least partially and contacting said plate; and d. a superconductive rod contacting said non-superconducting material and separated from the superconductive plate by said non-superconducting material and spaced from said superconductive plate by less than the coherence distance through the space separating it from the superconductive plate.

17. A superfluid device comprising:

a. a first and a second body of superfluid vented to each other through a weak link;

b. means for causing flow between said first and second bodies through the weak link; and c. means for applying control flow to said weak link.

18. Method of modulating flow between two regions in a superflow state across an interposed weak link capable of transferring superflow which is distinct from normal flow and of conducting control flow, comprising the steps of:

a. causing net flow between the two regions; and b. causing net control flow between a portion of the weak link and at least one of the regions.

19. Method of varying the critical current between two regions in a superconducting state separated by a region in a non-superconducting state comprising the steps of:

a. setting up a supercurrent between the two superconducting regions across the non-superconducting region; and b. introducing a control current into the non-superconducting region which current is returned through at least one of the superconducting regions.

20. Method of modulating superflow which is distinct from normal flow, said superflow proceeding across a region which impedes superflow comprising the steps of:

a. interposing the superflow impeding region between two regions in a superflow state separated by a distance of the order of the coherence distance within said superflow-impeding region;

b. setting up a superflow across the superflow-impeding region; and c. introducing a control flow into said superflow-impeding region.

21. A superflow device comprising:

a. a first region capable of emitting net flow at least part of which is superflow;

b. a second region capable of receiving net flow at least part of which is superflow;

c. a third region interposed at least partially between said first and second regions and capable of accepting flow emitted from said first region and of transferring at least a part of said flow to said second region; and d. means coupled with said third region for introducing therein a control flow which is distinct from the superflow between the first and second regions and which proceeds through the third region and through at least one of said first region and second region.

22. A superconductive device comprising:

a. a first region capable of emitting net current and characterized by internal flow of supercurrent;

b. a second region capable of receiving net current and characterized by internal flow of supercurrent;

c. a third region interposed at least partially between said first and second regions and capable of accepting net current emitted from said first region and of transferring at least a part of said current to said second region; and d. means coupled with said third region for exchanging therewith flow which is distinct from said net current emitted from the first region and which flow proceeds through the third region and through at least one of said first region and second region.

23. A device comprising:

a. a first and a second region characterized by phase coherence within at least a portion of the region, said regions separated from each other in at least one location by a distance which is of the order of the coherence distance of the separation;

b. a third region interposed between said first and second regions in said area and capable of transferring flow defined as main flow transmitted from one of said first and second region to the other; and c. means, independent of the main flow transferred between said first and second regions, for establishing a control flow proceeding through said third region and at least one of said first region and second region.

* * * * *